United States Patent [19]

Park

[11] 4,329,630
[45] May 11, 1982

[54] SINGLE TRANSISTOR POWER CONTROL CIRCUIT FOR A DC MOTOR WASHING MACHINE DRIVE

[75] Inventor: John N. Park, Rexford, N.Y.

[73] Assignee: General Electric Company, Louisville, Ky.

[21] Appl. No.: 109,705

[22] Filed: Jan. 4, 1980

[51] Int. Cl.³ .......................... H02P 5/40; H02P 3/12
[52] U.S. Cl. .................................. 318/258; 318/269; 318/293
[58] Field of Search ............... 318/256, 257, 258, 269, 318/273, 284, 285, 293, 294, 280–283, 287, 291; 68/12 R, 23.7

[56] References Cited

U.S. PATENT DOCUMENTS

| | | | |
|---|---|---|---|
| 3,152,462 | 10/1964 | Elliott et al. | 68/12 R |
| 3,152,463 | 10/1964 | Sones et al. | 68/12 R |
| 3,279,223 | 10/1966 | Severance et al. | 68/12 R |
| 3,369,381 | 2/1968 | Crane et al. | 318/257 |
| 3,982,161 | 9/1976 | Grace | 318/257 |
| 4,114,074 | 9/1978 | Stewart et al. | 318/257 |
| 4,118,658 | 10/1978 | Salva et al. | 318/257 |
| 4,215,303 | 7/1980 | Brimer | 318/281 |
| 4,234,834 | 11/1980 | Jennings | 318/293 |

Primary Examiner—David Smith, Jr.
Assistant Examiner—John B. Conklin
Attorney, Agent, or Firm—Radford M. Reams

[57] ABSTRACT

A low cost power control circuit which achieves variable speed, quasi four-quadrant motor control well suited to the requirements of a direct drive clothes washing machine. For handling relatively low frequency motor direction control signals (one or two Hertz), four relatively inexpensive, low frequency thyristors are employed in a four-leg bridge circuit arrangement. For handling relatively high frequency chopper duty cycle control signals (10 kHz), a single high frequency power transistor is employed. To provide quasi four-quadrant control entirely suitable for clothes washing, a fifth thyristor and a series dissipation resistor are connected across the motor terminals and switched ON during agitation just prior to each motor reversal when motor velocity is decreasing and motor back emf exceeds applied emf. A feedback servomechanism is employed to control motor rotational velocity via chopper pulse width modulation. In the feedback loop, the means for generating a signal representative of actual motor velocity preferably comprises a negative impedance converter circuit responsive both to overall voltage across the input terminals of the thyristor bridge and to current through the bridge and operable to minimize the effect of motor internal impedance to derive a signal representative of motor induced emf, and therefore representative of motor velocity, with improved accuracy.

18 Claims, 7 Drawing Figures

SINGLE TRANSISTOR POWER CONTROL CIRCUIT FOR A DC MOTOR WASHING MACHINE DRIVE

BACKGROUND OF THE INVENTION

The present invention relates generally to a power control system for driving a DC motor in a manner suited to the needs of a direct drive washing machine and, more particularly, to a down-chopper power control circuit providing quasi four-quadrant control entirely suited to the needs of a clothes washing machine.

Typical commercially produced domestic clothes washing machine designs have employed a constant speed motor, for example rotating at 1800 rpm, in combination with a mechanical transmission system selectively operable to provide either relatively low speed oscillatory motion for agitation, or relatively higher speed (for example 600 rpm) unidirectional rotation for spinout operations.

In the prior art there are a number of proposals to eliminate the complexity of a mechanical transmission, particularly that complexity associated with providing agitation, by employing a direct drive DC motor coupled (either directly or, through simple reduction gearing) to the agitator and basket of a clothes washing machine. Through suitable input control signals, a DC motor may be readily controlled as to both rotational velocity and direction, including periodic reversing, to effect the required motions.

By way of example, the following patents are identified for their disclosures of various forms of direct drive clothes washing machines: Elliott et al U.S. Pat. No. 3,152,462; Sones et al. U.S. Pat. No. 3,152,463; Severance et al. U.S. Pat. No. 3,279,223; Crane et al U.S. Pat. No. 3,369,381; and Lake U.S. Pat. No. 3,503,228. Additional and more recent comprehensive examples are disclosed in a commonly-assigned copending U.S. patent application Ser. No. 077,656 filed Sept. 21, 1979 by David M. Erdman, the entire disclosure of which is hereby incorporated by reference. (No representation is made or intended herein concerning whether any or all of the disclosure of the above-identified Erdman application is prior art with respect to the present invention.)

In addition to the patents and patent application identified above for their disclosures of washing machine controls, the following three patents are identified for their disclosures of related solid state motor control circuits for applications other than clothes washing machines: Grace U.S. Pat. No. 3,982,161; Stewart et al. U.S. Pat. No. 4,114,074; and Salva et al U.S. Pat. No. 4,118,658.

Conventional four quadrant chopper power supplies which are applicable to the type of variable speed and reversible drive service required on a clothes washing machine typically exhibit a high degree of circuit complexity, and often require four costly high speed, high voltage semiconductor devices, along with attendant protective circuitry. Numerous circuits having various degrees of complexity have been proposed, employing both transistors and thyristors. Recently, relatively low cost power transistors have become commercially available which are capable of switching up to fifty amperes and of operating directly off the AC line. The use of transistors rather than thyristors allows a decrease in power circuitry complexity by permitting the elimination of commutation circuitry inherent to the use of thyristors. Additionally, the use of transistors permits rapid ON/OFF switching for chopper type duty cycle power level control at relatively high frequencies, allowing the employment of lower volume magnetics for both local energy storage and conducted electro magnetic interference (EMI) reduction. A reversing motor normally requires full four-quadrant power circuit operation which necessitates either a full bridge (four power switches), or a half bridge (two power switches plus two expensive capacitors) power circuit configuration.

By the present invention there is provided a power control circuit which achieves variable speed quasi four-quadrant motor control well suited to the requirements of a direct drive clothes washing machine, while permitting reduction in circuit complexity, parts count, cost, volume and weight.

SUMMARY OF THE INVENTION

Accordingly, it is an object of the invention to provide a minimum cost, low weight, low volume power control circuit suited to variable speed control of a fractional horsepower DC motor in a clothes washer drive system.

Briefly stated, and in accordance with a broader concept of the invention, particular advantage is taken of the control requirements of a clothes washing machine. Specifically, the motor direction control signals are relatively low frequency, in the order of one or two Hertz for agitation, and zero Hertz (DC) for spinout. For handling these particular control signals, four relatively inexpensive, low frequency thyristors, for example silicon controlled rectifiers (SCR's), are employed in a four-leg bridge circuit arrangement. Many problems conventionally requiring expensive solutions are avoided by the low frequency nature of the direction control signals.

On the other hand, the speed control signals are relatively high frequency in that a chopper circuit implementing duty cycle power level control, for example pulse width modulation (PWM) at ten or twenty kHz, is employed. For handling these particular control signals, the subject motor control circuit employs a single high frequency power transistor. Power transistors have the advantage over thyristors such as triacs and SCR's of not requiring additional circuitry for commutation. Although transistors are more expensive than thyristors, in accordance with the present invention one, rather than the conventional four, is employed.

An additional broad concept in accordance with the invention is the provision of quasi four-quadrant control (providing braking action for slowing in either rotation direction, in addition to powered rotation) by means of a fifth thyristor and a series dissipation resistor connected across the motor terminals and switched on at appropriate times during operation. In particular, just prior to a reversal of motor rotation when motor velocity is decreasing, motor induced back emf may exceed applied emf, causing current to momentarily be zero. At this point, the fifth thyristor is triggered, and remains in conduction until motor current reaches zero, whereupon the thyristor self commutates. In order to provide braking action for either rotational direction, a bi-directional thyristor must be employed, such as a triac, or a pair of oppositely poled SCR's.

This particular approach to braking, as noted above provides quasi four-quadrant control, and yet avoids the circuit complexity necessary when feeding power back into the source for braking. Since the particular motor load, i.e., clothes being agitated, has a fairly high degree of inherent damping and does not require positive braking as would be the case for a vehicle or hoist control, this particular approach provides sufficiently accurate control over agitator motion, without unduly wasting energy through dissipation in the braking resistor.

Briefly stated, and in accordance with a more particular aspect of the invention, a power control circuit for a DC washing machine drive motor having a pair of DC input terminals is responsive both to relatively lower frequency motor direction control input signals, and to relatively higher frequency chopper duty cycle speed control input signals. The power control circuit includes a pair of DC supply conductors, and a high frequency switching transistor connected in series between one of the DC supply conductors and a chopped DC supply conductor. The circuit additionally includes a four-leg polarity-reversing thyristor bridge having an opposite pair of input nodes respectively connected to the chopped DC supply conductor and to the other of the DC supply conductors, and having opposite pair of output nodes connected to respective motor input terminals such that motor polarity, and thus direction, is controlled by activating either one or the other pair of diagonally opposite thyristors. The power control circuit further includes circuitry for applying the relatively higher frequency chopper duty cycle speed control input signals to activate the high frequency switching transistor, and for applying the relatively lower frequency motor direction control input signals to alternately activate the bridge thyristors in diagonally opposite pairs.

In accordance with another aspect of the invention, the power control circuit additionally includes a braking circuit comprising a braking thyristor and a dissipative circuit element, such as a resistor, connected in series across the motor input terminals, and circuitry for sensing the envelope of bridge current (exclusive of relatively higher frequency chopping components) and for triggering the braking thyristor when the envelope of bridge current is zero due to motor induced back emf at least equalling applied emf.

Briefly stated, and in accordance with still another aspect of the invention, a control system for a DC washing machine drive motor having a pair of DC input terminals includes a pair of DC supply conductors, and a high frequency switching transistor connected in series between one of the DC supply conductors and a chopped DC supply conductor. A four-leg polarity-reversing thyristor bridge having an opposite pair of input nodes respectively connected to the chopped DC supply conductor and to the other of the DC supply conductors is provided, and the thyristor bridge has an opposite pair of output nodes connected to respective motor input terminals. The arrangement is such that motor polarity, and thus rotational direction, is controlled by activating either one or the other pair of diagonally opposite thyristors. The system additionally includes a source of relatively lower frequency control signals representing desired motor rotational velocity and direction for agitation cycles. Circuitry is responsive to the relatively lower frequency control signals for applying relatively higher frequency chopper duty cycle controlled switching signals to activate the switching transistor in accordance with the signals representing desired motor rotational velocity, and circuitry is responsive to the relatively lower frequency control signals for alternately activating the thyristors in diagonally opposite pairs in accordance with the signals representing desired motor rotational direction.

In accordance with still another aspect of the invention, the circuitry for applying chopper duty cycle controlled switching signals to the switching transistor comprises a feedback servomechanism including means for generating a signal representative of actual motor velocity and an error amplifier responsive to the signal representing desired motor rotational velocity and to the signal representative of actual motor velocity to generate a difference signal. A duty cycle controller, such as a pulse width modulator, is responsive to the difference signal to provide transistor switching signals.

Briefly stated, and in accordance with still another aspect of the invention, the means for generating a signal representative of actual motor velocity preferably comprises a negative impedance converter circuit responsive both to overall voltage across the input terminals of the thyristor bridge and to current through the bridge and operable to minimize the effect of motor internal impedance to derive a signal representative of motor induced emf, and therefore representative of motor velocity, with improved accuracy.

BRIEF DESCRIPTION OF THE DRAWINGS

While the novel features of the invention are pointed out with particularity in the appended claims, the invention, both as to organization and content, will be better understood and appreciated from the following detailed description taken in conjunction with the drawings, in which:

DESCRIPTION OF THE PREFERRED EMBODIMENTS

Figure 1:
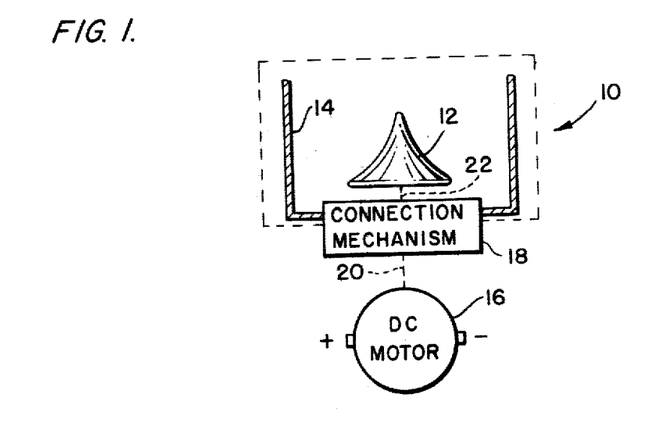
FIG. 1 is a highly schematic representation of a clothes washing machine of the direct drive type employing a reversible and velocity controllable DC motor.

Referring now to the drawings, wherein identical reference numerals denote similar or corresponding elements throughout the various views, FIG. 1 is a highly schematic representation of a clothes washing machine 10 having a conventional agitator 12 and a tub 14 driven by a bi-directional motor 16 capable of producing relatively slow oscillation of the agitator 12 during the wash cycle, and relatively high speed unidirectional spinning of the agitator 12 and tub 14 during a spinout cycle. Both types of motions are implemented by means of appropriate control of the voltage and current applied to the windings of the motor 16.

Insofar as the present invention is concerned, a wide variety of DC motors may be employed, either shunt or permanent magnet field. Preferably, the DC motor 16 is a disc-type electronically commutated motor (ECM), eliminating the need for mechanically contacting brushes.

The remaining element in FIG. 1 is a connection mechanism 18 comprising a shifting device and a relatively simple reduction gearing mechanical transmission. The connection mechanism 18 has an input shaft 20 driven by the motor 16, an output shaft 22 for driving the agitator 12, and a connection to the tub 14. The connection mechanism 18 is operable in an agitate mode to transmit oscillatory motion of the input shaft 20 to the output shaft 22 to effect agitation and laundering of clothes within the tube 14. In the spinout mode, the connection mechanism 18 is operable to transmit unidirectional rotation of the input shaft 22 to effect conjoint unidirectional rotation of the agitator 12 and the tub 14. In both modes, depending upon the precise characteristics of the motor 16, simple reduction gearing may be employed within the connection mechanism 18, although it will be appreciated that the connection mechanism 18 does not include any means for translating unidirectional input shaft rotation into output shaft oscillation, as is the case with conventional clothes washing machine transmissions. A detailed description of a suitable connection mechanism 18 may be found in the above-referenced Erdman Application Ser. No. 077,656, filed Sept. 21, 1979.

Figure 2:
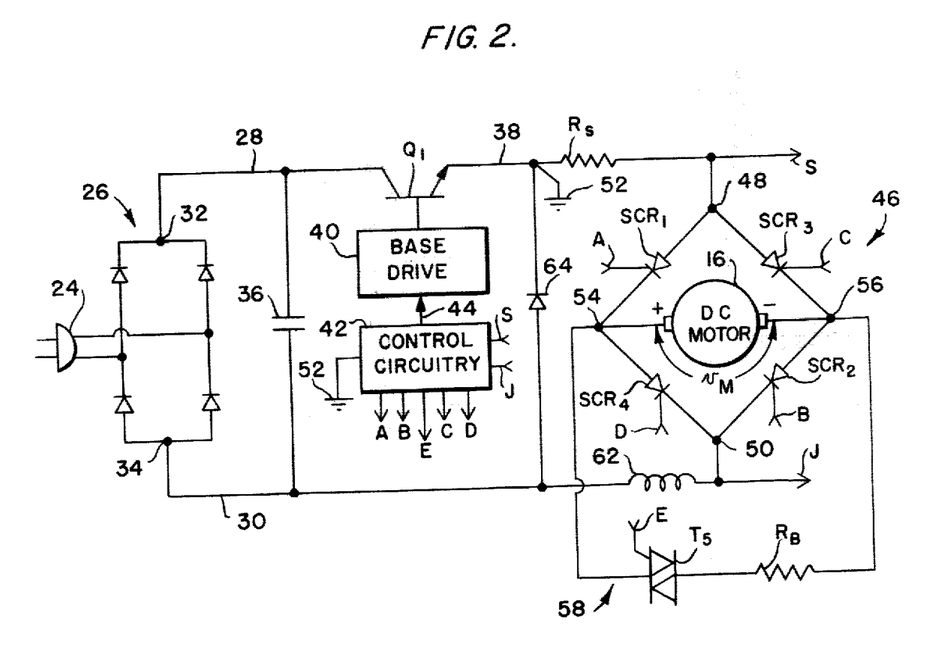
FIG. 2 is an electrical schematic diagram of basic power control circuitry in accordance with the present invention.

Referring now to FIG. 2, there is shown an overall schematic diagram of the main power carrying components in accordance with an illustrative embodiment of the invention, together with control circuitry identified in block form. The circuit of FIG. 2 is supplied via a plug 24 from a conventional 117 volt household branch circuit, and includes a full wave bridge rectifier 26 supplying a pair of DC supply conductors 28 and 30, the bridge output nodes 32 and 34 respectively serving as DC input teminals for the rest of the FIG. 2 circuitry.

A filter capacitor 36 is connected across the DC supply conductors 28 and 30, and is sized to provide adequate local energy storage for supplying the chopping components of current while, at the same time, having minimum adverse impact upon input power factor. The chopper control circuit to the right of the capacitor 36 in FIG. 2 is thus supplied with relatively high ripple DC input voltage or, expressed alternatively, substantially unfiltered rectified AC power. It will be appreciated that this is not an essential aspect of the invention, although it does have substantial advantages, especially in terms of cost. The detailed control circuitry described hereinafter is designed so as to be operable from such high ripple DC input voltage.

A high frequency switching or chopper transistor $Q_1$ has its collector/emitter circuit connected in series between one of the DC supply conductors 28 and a chopped DC supply conductor 38. In operation, the chopper transistor $Q_1$ serves to control motor 16 voltage via duty cycle power control, specifically pulse width modulation (PWM), at a chopping or switching frequency in the order of ten to twenty kHz.

A base drive circuit 40 controls the conduction of the chopper transistor $Q_1$, which, to reduce the power requirements for the base drive circuit 40, is a Darlington transistor. Control circuitry 42 signals the base drive circuit 40 via a connection 44.

Connected across the chopped DC supply conductor 38 and the other 30 of the DC supply conductors is a four-leg polarity-reversing thyristor bridge 46 having an opposite pair of input nodes 48 and 50 connected respectively to the chopped DC supply conductor 38 and the other 30 of the DC supply conductors. In order to provide capability for sensing current through the thyristor bridge 46, a low value current sensing resistor $R_S$ is connected in series between the chopped DC supply conductor 38 and the input node 48. For convenience, the end of the current sensing resistor $R_S$ connected to the supply conductor 38 is also connected to a common circuit reference point 52, and the other end of the current sensing resistor $R_S$ which is connected to the input node 48 is also connected to a current sense line S which then supplies a voltage representative of bridge current to the control circuitry 44.

The thyristor bridge 46 also has an opposite pair of output nodes 54 and 56 connected to respective designated (+) and (−) input terminals of the motor 16.

The thyristor bridge 46 may be seen to comprise four thyristors which, in this particular circuit, are silicon controlled rectifiers (SCR's) designated $SCR_1$, $SCR_2$, $SCR_3$ and $SCR_4$. The gate or trigger input terminals of the four SCR's are respectively denoted A, B, C and D.

The thyristor bridge 46 is intended to be operated by activating either one or the other pair of diagonally opposite SCR's such that motor polarity may be selectively reversed to control direction of motor rotation. In particular, for one direction of rotation, $SCR_1$ and $SCR_2$ are conducting while $SCR_3$ and $SCR_4$ are off. For the other direction of motor rotation, $SCR_3$ and $SCR_4$ are conducting while $SCR_1$ and $SCR_2$ are off.

Also shown in FIG. 2 is a braking circuit, generally designated 58, which comprises a braking thyristor in the form of a triac $T_5$ and a dissipative circuit element in the form of a resistor $R_B$ connected in series across the motor 16 input terminals (+) and (−).

To complete the overall circuitry shown in FIG. 2, a smoothing inductor 62 is connected in series between the other DC supply conductor 30 and the lower node 50 of the thyristor bridge 46, and a free-wheeling diode 64 is connected between the chopper transistor Q, emitter and the negative DC supply line 30. The node 50 is also connected to a voltage sense line J which supplies to the control circuitry 42 with the total voltage across the thyristor bridge 46 (plus that across the current sensing resistor $R_S$) referenced to the common circuit reference point 52. The voltage sense signal on the line J, together with the current sense signal on the line S, are used for control functions as hereafter described in detail.

The operation of the circuitry as thus far described is as follows. In the "agitate" mode, a suitable low frequency control signal, for example a one or two Hertz full wave rectified sine wave, generated within the control circuitry 42 programs applied motor voltage $v_M$ through high frequency pulse width modulation effected by controlling the chopper transistor $Q_1$. During the first half cycle of $i_L$, $SCR_1$ and $SCR_2$ are turned on by the control circuitry 42, while $SCR_3$, $SCR_4$ and triac $T_5$ remain off. Current enters the (+) designated motor 16 terminal to cause rotation thereof in a direction determined by the thyristor bridge 46 and at a velocity determined by the current $i_L$ controlled by the chopper transistor $Q_1$. At the end of the first 1 or 2 Hz half cycle, the control circuitry 42 triggers $SCR_3$ and $SCR_4$ into conduction, while $SCR_1$ and $SCR_2$ commutate naturally at current zero.

It will therefore be appreciated that motor speed and direction are cyclically controlled, with relatively low cost silicon controlled rectifiers $SCR_1$, $SCR_2$, $SCR_3$ and $SCR_4$ performing the relatively low frequency directional control function, and with a single transistor, i.e. chopper transistor $Q_1$, performing the speed control function.

The description of operation immediately above assumes negligible motor and system inertia. While such inertia is, of course, not zero, the effects thereof are to a large degree damped by the clothes load being agitated. Nevertheless, motor braking action is desirable during those portions of each agitation cycle during which actual motor velocity exceeds commanded motor velocity. In particular, during the latter portion of each $i_L$ current half cycle, current zero is reached before motor voltage zero due to motor back emf. At this point, the control circuitry 42 (which senses current via the current sense line S) commands the braking triac $T_5$ on, while the particular pair of SCR's then conducting naturally commutate off. The motor 16 then dissipates its stored mechanical energy in the braking resistor $R_B$ until the control circuitry 42 commands the start of the next agitator 12 half-cycle.

For the spin mode, operation is much simpler, as periodic reversing and braking operations are not required. Specifically, unidirectional spin rotation is obtained in the desired direction by sustaining the appropriate pair of SCR's (either $SCR_1$ and $SCR_2$ or $SCR_3$ and $SCR_4$) in conduction, while programming motor 16 speed through $Q_1$ chopper control.

Accordingly, it will be appreciated that quasi four quadrant control of a DC machine is realized using a down chopper ($Q_1$) and a thyristor bridge 46. In an application such as a clothes washing machine where agitate frequencies are measured in Hertz, the thyristors used in the bridge 46 and brake 58 circuits are small, slow and inexpensive units when compared to the devices required for full four-quadrant active control.

The remaining drawing FIGS. 3–7 are schematic circuit diagrams in various levels of detail showing a particular embodiment of the invention, including the control circuitry 42 and base drive circuitry 40 of FIG. 2. Standard, off-the-shelf circuit components, particularly integrated circuit devices, are extensively utilized, including operational amplifiers and CMOS logic devices. For clarity of illustration, conventional low voltage DC power supplies are omitted, as well as power supply connections to the integrated circuit devices which, it will be appreciated, are required for proper operation. In particular, the circuitry hereinafter described requires two DC power supplies, one supplying plus and minus fifteen volts with reference to the common circuit reference point 52 and the other supplying plus and minus twelve volts with reference to the common circuit reference point 52.

Figure 3:
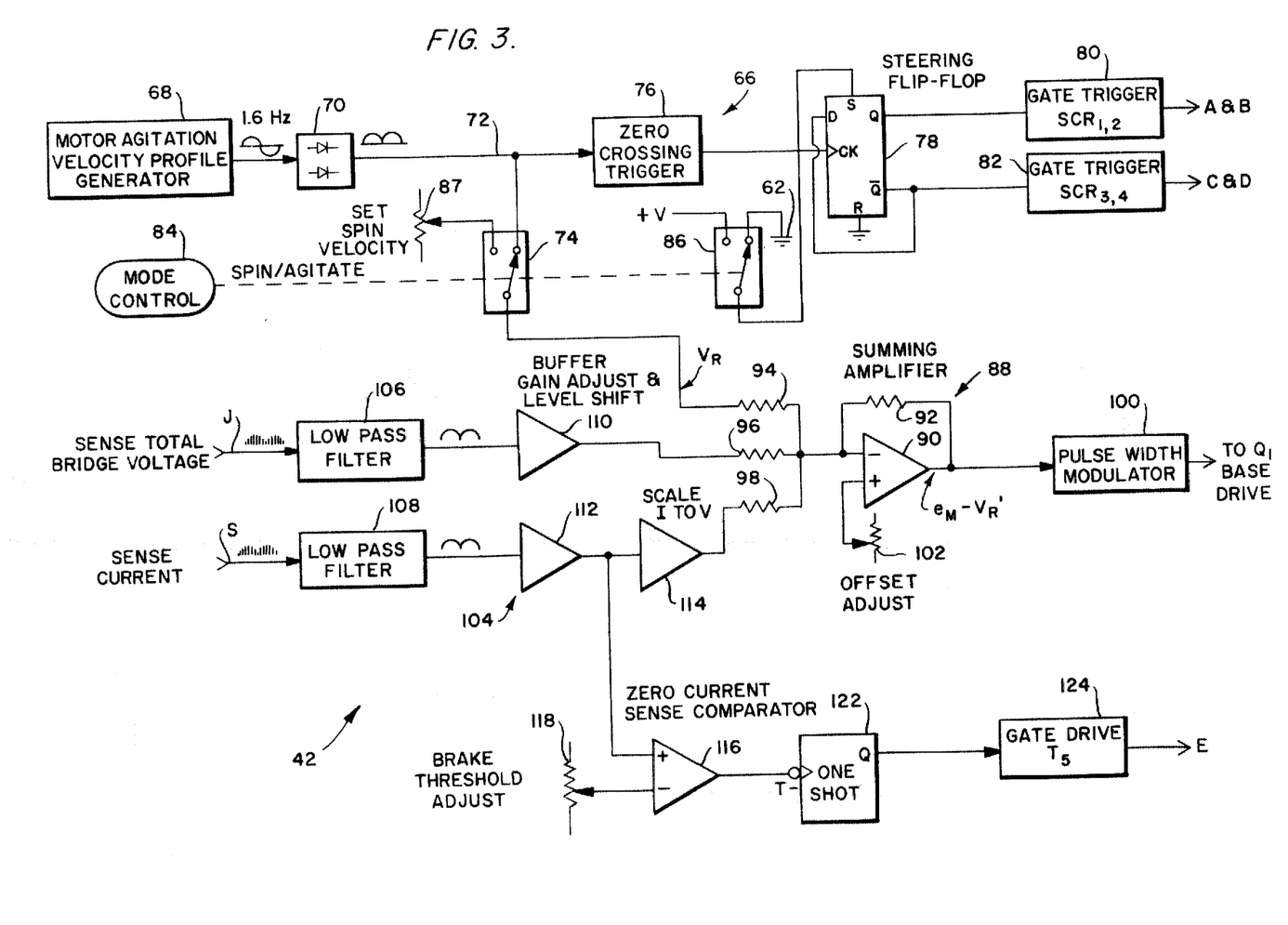
FIG. 3 in an overall block diagram of the control circuitry identified in the FIG. 2 diagram.

Referring now to FIG. 3, there is shown an overall control block diagram, generally representing the control circuitry 42 of FIG. 1. In the upper of three channels shown generally in FIG. 3, a source of relatively lower frequency control signals representing desired motor rotation velocity and direction for agitation cycles is generally designated 66. More particularly, the source 66 of relatively lower frequency control signals comprises a motor agitation velocity profile generator 68 outputting a signal oscillating about a reference level at relatively low frequency, the instantaneous magnitude of the oscillating signal with respect to the reference level representing desired motor rotational velocity and direction for agitation cycles. In the illustrated embodiment, this oscillating signal is a 1.6 Hz sine wave, although it will be appreciated that other agitation velocity profiles may advantageously be employed, as is described in the above referenced Erdman Application Ser. No. 077,656, in which case another waveform, for example a 1.6 Hz triangular waveform, might be generated.

The signal from the velocity profile generator 68 supplies a precision full wave rectifier 70 which provides a full wave rectified signal on line 72 representing the absolute value of desired motor velocity. For velocity control, the signal on line 72 is coupled through an analog switch 74 to a $V_R$ line which inputs the desired velocity to the control input of a velocity control servomechanism comprising the second of the three channels shown generally in FIG. 3.

In order to sense the crossing of the oscillating signal from the generator 68 through the reference level to generate a signal to change rotational direction, a zero crossing trigger 76 comprises a comparator which senses when the voltage on the line 72 approaches zero, and outputs a signal to clock a steering flip-flop 78 which assumes either one or the other of a pair of bistable states respectively indicating which pair of SCR's in the thyristor bridge 46 (FIG. 2) is to be conducting. More particularly, the steering flip-flop 78 may be seen to comprise a D-type flip-flop with the D input connected to the $\overline{Q}$ output in a conventional divide-by-two configuration. The Q output of the steering flip-flop 78 is connected to gate trigger circuitry 80 for $SCR_1$ and $SCR_2$, supplying gating signals A and B, and the steering flip-flop 78 $\overline{Q}$ output is connected to gate trigger circuitry 82 to control conduction of $SCR_3$ and $SCR_4$, supplying the gating signals C and D.

In order to cause unidirectional rotation for spinout operations, the Set (S) input of the steering flip-flop 78 is arranged for selective connection either to a logic low (circuit reference 62) or a logic high (+V) voltage in response to an input signal from an external mode control 84 comprising an element of a conventional washing machine program control switch, or the like. In FIG. 3, this selective connection is accomplished by means of another analog switch 86 operated by the mode control 84, with a slightly different connection shown in the FIG. 5A detailed logic diagram. The characteristics of the steering flip-flop 78 are such that when the Set (S) input is tied to logic low, (the condition illustrated in FIG. 3), the steering flip-flop 78 is free to toggle in response to pulses from the zero crossing trigger 76 appearing on the clock (CK) input. When the mode control 86 calls for a spinning operation, the Set (S) input is tied to logic high. The Q output of the steering flip-flop 78 is then held at logic high, and the $\overline{Q}$ output at logic low. This ensures that only $SCR_1$ and $SCR_2$ (FIG. 2) may be gated.

Circuitry suitable for the upper channel of FIG. 3 as thus far described is shown in greater detail in FIGS. 5A and 5B, hereinafter described.

The analog switch 74 is also controlled by the mode control input 86 and functions to supply the velocity command line $V_R$ either from the line 72, as described above, or from a Set Spin Velocity potentiometer 87 which supplies a constant voltage on the $V_R$ line during the spinout mode, which constant voltage determines the spin speed.

The preferred method of motor 16 speed control is through the use of a feedback servomechanism which includes a summing amplifier 88 comprising an operational amplifier 90 with appropriate feedback 92 and input resistors 94, 96 and 98 connected to its inverting (−) input. The output of the summing amplifier 88 controls a conventional pulse width modulator 100 which, in turn, supplies the $Q_1$ base drive circuitry 40 (FIG. 2). The summing amplifier 88 additionally includes an offset adjustment potentiometer 102 connected to its non-inverting (+) input.

In particular, the summing amplifier 88 is responsive both to signals on the line $V_R$ representing instantaneous desired motor rotational velocity and to a signal representative of actual motor velocity and functions to generate a difference of "error" signal represented by the expression $e_M - V_R'$.

In general, it will be appreciated that the feedback arrangement, as thus far described, provides for conventional control over motor rotational velocity, commanding the chopper transistor $Q_1$ via the the pulse width modulator 100 as required to maintain actual motor velocity at or near the desired motor velocity as indicated by $V_R$.

It will further be appreciated that a variety of means may be employed to generate a signal representative of actual motor velocity to be summed with the reference velocity in the summing amplifier 88. For example, a simple tachometer may be driven by the motor 16 shaft.

However, in accordance with the invention, the preferred method is to sense motor induced back emf as an indicator of motor velocity. To accomplish this, total thyristor bridge voltage and bridge current are sensed via the lines J and S connected as shown in FIG. 2. This technique allows motor voltage and current to be sensed in a manner insensitive to the actual motor polarity even as diagonally opposite pairs of the SCR's are triggered ON. In order to minimize the effect of motor internal impedance, and thereby to improve accuracy, a negative impedance converter circuit, generally designated 104, appropriately combines the bridge voltage and current signals by means of operational amplifiers and suitable feedback networks. This circuitry is described in detail below with particular reference to FIG. 6.

In FIG. 3, it will be seen that the J and S voltage and current sense lines are connected to respective low pass filters 106 and 108. The low pass filters 106 and 108 function to filter out the high frequency chopping components (e.g., 10 kHz) resulting from pulse width modulation of $Q_1$ conduction, and to pass the respective low frequency (e.g., 1.6 Hz) envelopes of bridge voltage and bridge current on to the remainder of the circuitry, including the negative impedance converter circuit 104.

The negative impedance converter circuit 104 is illustrated in rather general form in FIG. 3 comprises a pair of representative operational amplifiers 110 and 112 which perform the functions of buffering and gain adjustment. The operational amplifier 110 output is connected to the summing amplifier 88 through input resistor 96, and the operational amplifier 112 is connected to the summing amplifier 88 through a scaling amplifier 114 and the input resistor 98.

The circuit component values are selected and adjusted to provide proper scaling such that the summing taking place at the input of the summing amplifier 88 in effect subtracts out the voltage drop due to motor 16 internal impedance. The output of the summing amplifier 88 then represents the amplified voltage difference between motor 16 back emf (proportional to rotational velocity) and the reference voltage $V_R'$ (proportional to desired motor rotational velocity).

To control the brake function, the output of the operational amplifier 112 is additionally supplied to the non-inverting (+) input of a comparator 116, the inverting (−) input of which serves as a reference input and is supplied from a potentiometer 118. The potentiometer 118 functions to set the brake threshold.

More particularly, the output of the operational amplifier 112 is the bridge 46 current envelope, and the comparator 116 comprises a zero current sense comparator which outputs a logic low signal when sensed current is zero. Accordingly, the brake threshold adjustment potentiometer 118 is adjusted such that the reference voltage on the inverting (−) input of the comparator 116 equals the voltage to be expected on the non-inverting (+) input when bridge current reaches zero. When bridge current is zero, the output of the comparator 116 goes low.

The comparator 116 output is in turn connected to the low activated trigger (T−) input of a one-shot 122 comprising a precision monostable multivibrator integrated circuit. The Q output of the one shot 122 supplies a gate drive circuit 124 which drives the control line E for triggering the braking triac $T_5$ (FIG. 2) when thyristor bridge 46 current is zero.

Figure 4:
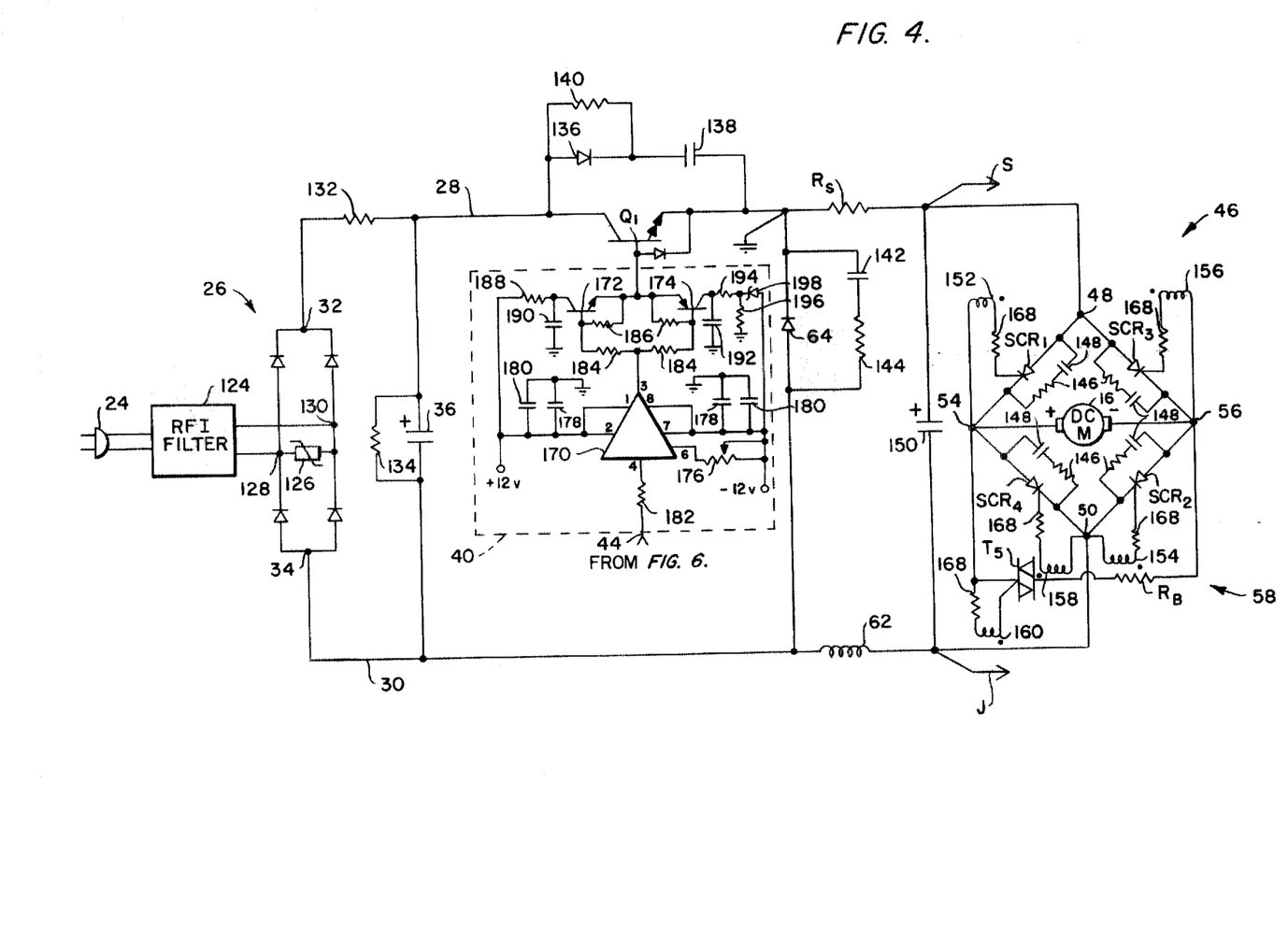
FIG. 4 is a schematic showing the basic power control circuitry of FIG. 2 in much greater detail.

Referring now to FIG. 4, there is shown a schematic diagram similar to that of FIG. 2, but including additional details of a practical circuit embodiment. It should be noted that the detailed circuit described herein with reference to FIGS. 4, 5A, 5B, 6 and 7 is one known to be operable, but it is anticipated that the circuitry could be simplified considerably, such as by eliminating a number of adjustment points and simplifying the power supply arrangement, and still produce the desired operation.

On the power input side of FIG. 4, a radio frequency interference (RFI) filter, which may be a Corcom Model 20R1, is interposed between the power input plug 24 and the full wave bridge rectifier 26. Additionally, a transient limiting varistor 126 is connected across the AC input nodes 128 and 130 of the bridge rectifier 26. Connected in series between the bridge rectifier +DC output node 32 and the DC supply conductor 28 is a low value surge current limiting resistor 132. A bleeder resistor 134 is connected across the input filter capacitor 36 which, as noted above, is sized to provide adequate local energy storage for supplying the chopping components of current while, at the same time, having minimum adverse impact upon input power factor, and leaving a relatively "high ripple" DC voltage across the supply conductors 28 and 30.

Across the collector and emitter terminals of the chopper transistor $Q_1$ is a protective network comprising a series connected diode 136 and capacitor 138, with a resistor 140 in parallel with the diode 136. A similar protective network comprising a series capacitor 142 and resistor 144 combination is connected across the free-wheeling diode 64.

Similarly, snubbing networks each comprising the series combination of a resistor 146 and a capacitor 148 are connected between the anode and cathode terminal of each of the four SCR's comprising the thyristor bridge 46. For additional high frequency transient supression, a capacitor 150 is connected across the bridge 46 input nodes 48 and 50.

Figures 5A, 5B:
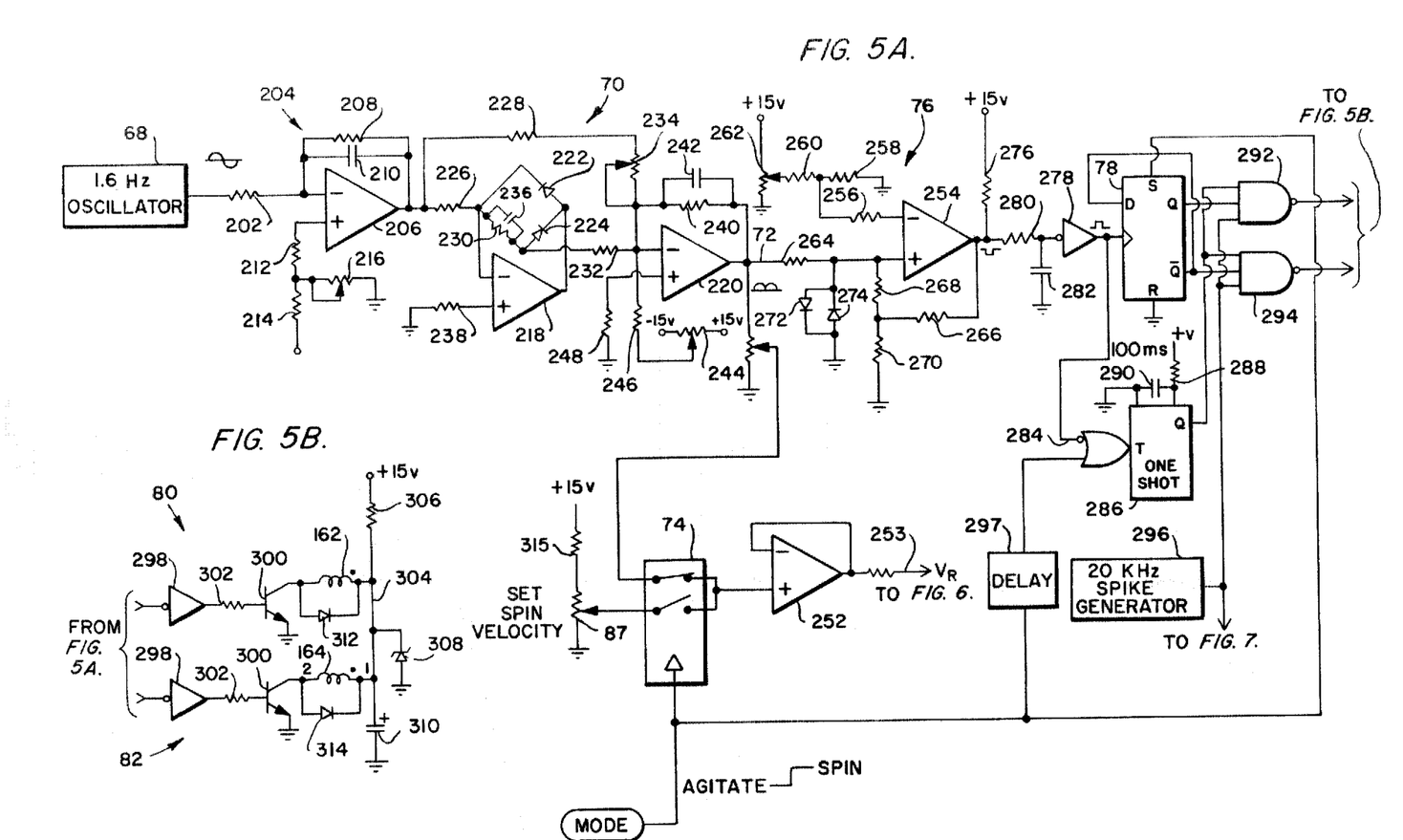
FIGS. 5A and 5B together are a schematic diagram showing details of circuitry suitable for the upper of three channels generally shown in FIG. 3.
Figure 7:
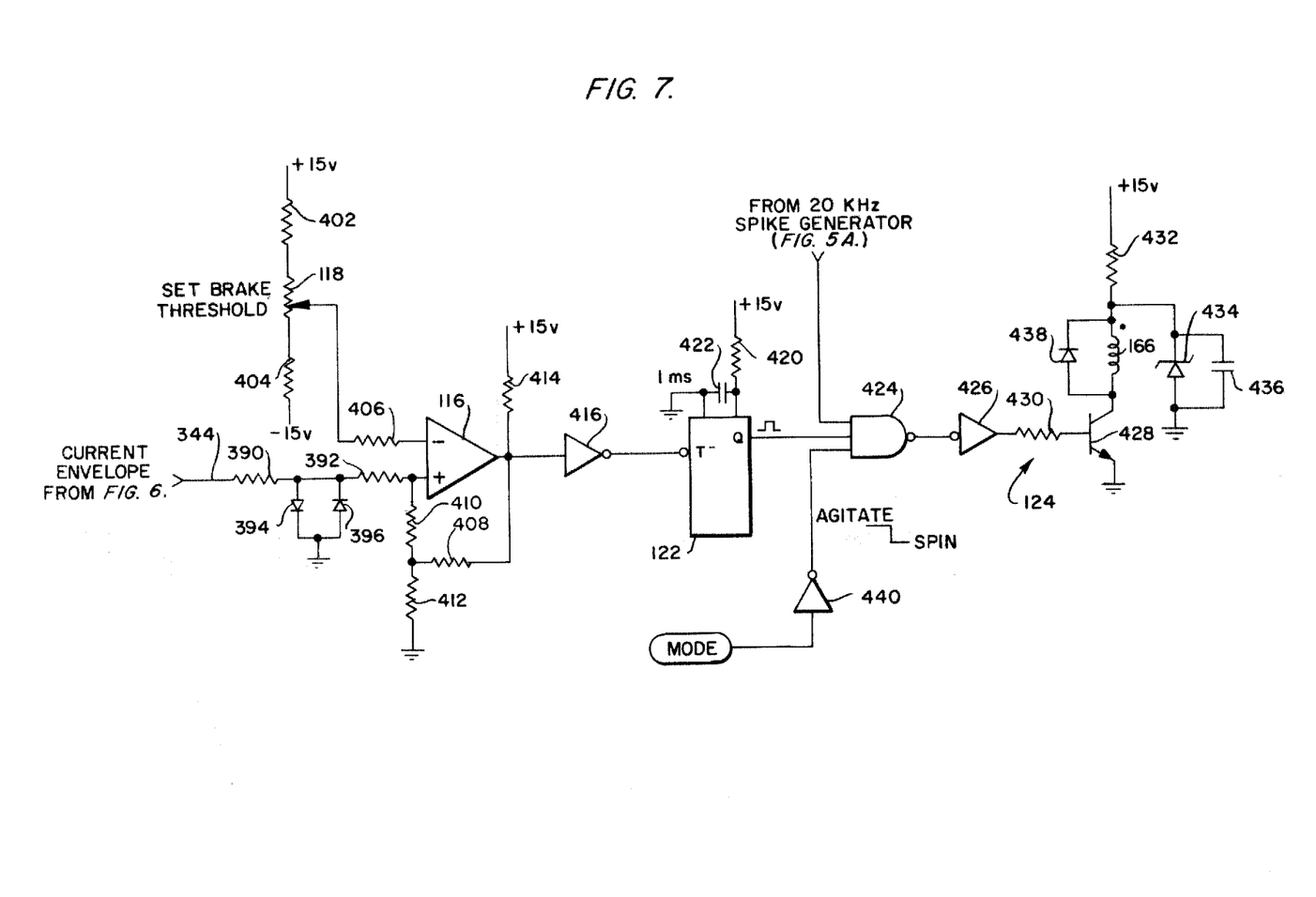
FIG. 7 is a detailed schematic diagram of circuitry suitable for the lowest of the three channels generally shown in FIG. 3, more particularly comprising the circuitry for triggering the braking circuit thyristor at appropriate times.

The gates of each of the relatively low frequency thyristors in the circuit, specifically the four SCR's of the thyristor bridge 46, and the triac $T_5$, are all driven by respective secondary windings 152, 154, 156, 158 and 160 of pulse transformers, the primary windings of which are shown in FIGS. 5B and 7. Since $SCR_1$ and $SCR_2$ are triggered into conduction simultaneously, their respective pulse transformer secondary windings 152 and 154 are driven by the same primary winding, which, in FIG. 5B is designated 162. Similarly, the secondary windings 156 and 158 which respectively simultaneously gate $SCR_3$ and $SCR_4$ are supplied from a single pulse transformer primary winding 164, also shown in FIG. 5B. The pulse transformer secondary winding 160 for the braking triac $T_5$ is driven by a primary winding 166, shown in FIG. 7. In series with each of the pulse transformer secondary windings 152, 154, 156, 158 and 160 are individual gate current limiting resistors 168.

For driving the base of the chopper transistor $Q_1$, the base drive circuitry 40 shown in FIG. 2 as a box may more particularly be seen in FIG. 4 to comprise a high speed integrated circuit buffer amplifier 170 driving a pair of complementary NPN and PNP output transistors 172 and 174. The buffer amplifier 170 may comprise a National Semiconductor Type Number LH0063K operational amplifier, for which appropriate pin connections are shown. A variable resistor 176 provides offset adjustment for the amplifier 170, while capacitors 178 and 180 provide power supply decoupling. An input resistor 182 for the buffer amplifier 170 is connected in series with the line 44.

Base drive circuitry for the NPN/PNP complementary transistor pair 172 and 174 comprises individual series resistors 184, and individual base biasing resistors 186. The collector of the NPN transistor 172 has a biasing resistor 188 connected to the +12 volt supply, and a decoupling capacitor 190. Similarly, the collector of the PNP transistor 174 is biased and supplied from −12 volts by means of a decoupling capacitor 192, biasing resistors 194 and 196, and a 7 volt, 1 watt voltage regulating Zener diode 198.

In operation, it will be understood that control signals applied to the base drive circuit 40 input line 44 cause rapid and reliable ON/OFF switching of the chopper transistor $Q_1$. In particular, a +11 volt signal level on the line 44 causes the chopper transistor $Q_1$ to rapidly be biased into conduction, while a −12 volt signal level applied on the input line 44 causes the chopper transistor $Q_1$ to rapidly and reliably be turned OFF.

With reference now to FIG. 5A, there is shown a detailed schematic diagram suitable circuitry for the upper portion of FIG. 3. In FIG. 5B, the motor agitation velocity profile generator 68 of FIG. 3 may more particularly be seen to comprise a 1.6 Hz sine wave oscillator of conventional design. For example, an integrated circuit function generator manufactured by Exar under their type No. XR22068 may be employed. The output of the 1.6 Hz oscillator 68 is applied to the input resistor 202 of a unity gain buffer amplifier 204 comprising an operational amplifier 206 with an appropriate feedback resistor 208. A small feedback capacitor 210 reduces noise. An offset adjustment network comprising resistors 212, 214 and a variable resistor 216 is connected to the operational amplifier 206 non-inverting (+) input.

The buffer amplifier 204 is followed by the precision full wave rectifier 70 which comprises a pair of operational amplifiers 218 and 220, with a pair of silicon switching diodes 222 and 224 in the feedback circuit of the operational amplifier 218. The complete feedback network of the operational amplifier 218 includes resistors 226, 228, 230, 232, and a variable trim adjustment resistor 234, connected as shown. A small value capacitor 236 parallels the resistor 230. The operational amplifier 218 non-inverting (+) input is tied to circuit reference through a single resistor 238. Additional feedback elements in the precision full wave rectifier 70, associated more particularly with the second operational amplifier 220, are a resistor 240 in parallel with a small capacitor 242. A potentiometer 244 provides a means for adjusting guard band width, and is connected through a series resistor 246 to the operational amplifier 220 inverting (−) input. The operational amplifier 220 non-inverting (+) input is tied to circuit reference through a single resistor 248.

The operational amplifier 220 thus supplies the signal line 72 with a full wave rectified version of the output signal of the 1.6 Hz oscillator 68.

The full wave rectifier signal on the line 72 is applied both through a potentiometer adjustment 250, the analog switch 74, a non-inverting buffer amplifier 252 and an output resistor 253 to supply the $V_R$ velocity reference line, and to the input of the zero crossing trigger 76.

The zero crossing trigger 76 in particular comprises an operational amplifier 254 configured as a comparator, the output of which is a low going pulse each time the instantaneous voltage on the line 72 dips below a threshold set by a network comprising resistors 256, 258, 260, and potentiometer 262 connected to the comparator 254 inverting (−) input. The comparator 254 includes an input resistor 264, and a feedback network comprising resistors 266, 268 and 270. A pair of oppositely-poled silicon switching diodes 272 and 274 limit input voltage swings to prevent saturation of the comparator 254. The comparator 254 output is tied through a resistor 276 to the +15 volt supply.

The output of the zero crossing trigger 76 comprising the comparator 254 is connected through an inverter 278 having an input resistor 280 and capacitor 282, the output of the inverter 278 being connected to the clock (CK) input of the steering flip-flop 78. The inverter 278 in operation outputs a high going pulse with each zero crossing, and the leading edge of this pulse clocks the steering flip-flop 78. The output of the inverter 278 is also connected to a negative-going trigger input 284 of a one-shot 286 comprising an integrated circuit monostable multivibrator having an external resistor 288 and capacitor 290 appropriately connected and selected to provide a 100 millisecond (ms) wide output pulse each time the one-shot 286 is triggered. In operation, the trailing edge of each pulse from the inverter 278 triggers the one-shot 286.

The Q and $\bar{Q}$ outputs of the steering flip-flop 78 are connected respectively to enabling inputs of a pair of NAND gates 292 and 294, which in turn supply a gate trigger circuit 80 and 82 of FIG. 5B.

Each of the NAND gates 292 and 294 has two additional inputs. One of these additional inputs is connected to the output of a 20 kHz spike generator 296 which provides suitable signals, gated through the NAND gates 292 and 294, for operation of the pulse transformers which actually gate the SCR's of the thyristor bridge 46 (FIGS. 2 and 4).

The Q output of the 100 ms one-shot 286 is connected to the other inputs of the NAND gate 292 and 294, and functions to cause a 100 millisecond burst of 20 kHz spikes from whichever one of the NAND gates 292 and 294 is enabled by the steering flip-flop 78 each time the one-shot 286 is triggered.

For causing unidirectional motor rotation during spinout operations, the MODE input is also connected to the steering flip-flop 78 Set (S) input. As indicated, the MODE input is at logic high for SPIN, and the connection ensures that the flip-flop 78 Q output enables the NAND gate 292 to initiate spinning in the proper direction. Additionally, to trigger the 100 ms one-shot 286 upon entering the spin mode, a positive-going trigger input thereof is supplied through a delay element 297. The delay element 297 ensures that the steering flip-flop 78 is set before the NAND gate 292 is permitted to pass 20 kHz spikes, and may simply comprise an AND gate with an input (not shown) tied to the steering flip-flop 78 Q output.

In operation, for agitation, the MODE input is low, and the analog switch 74 is in the position shown. The full wave rectified 1.6 Hz sine wave signals on the line 72 thus pass through the analog switch 74, the buffer amplifier 252 and the resistor 253 to supply the velocity reference line $V_R$. Additionally, each time the voltage on the line 72 approaches zero, the output of the comparator 254 goes low, beginning the zero crossing pulse and activating the inverter 278. The inverter 278 output, going high, in turn clocks the steering flip-flop 78, causing it to enable one or the other of the NAND gates 292 and 294. On the trailing edge of the zero crossing pulse, the one-shot 286 is triggered to cause the enabled one of the NAND gates 292 or 294 to pass 20 kHz spikes onto either the gate trigger circuit 80 or the gate trigger circuit 82 of FIG. 5B.

For spin operation, the MODE input is high, setting the steering flip-flop 78 such that the NAND gate 292 is enabled, and supplying the $V_R$ line with a steady DC voltage determined by the setting of the potentiometer 77, with a fixed resistor 315 limiting the spin velocity adjustment range. After a time sufficient to ensure that the NAND gate 292 is enabled, the 100 ms one-shot 286 is triggered, activating the NAND gate 292.

The FIG. 5B gate trigger circuits each comprise an individual inverter 298 supplying the individual PNP switching transistors 300 through individual base current limiting resistors 302. A regulated supply line 304 is supplied from the +15 volt supply through a resistor 306, with a volt Zener diode 308 and a filter capacitor 310 connected between the supply line 304 and the circuit reference point, and the pulse transformer primary windings 162 and 164 are connected between the supply line 304 and the collectors of the respective transistors 300, with free-wheeling diodes 312 and 314 connected in parallel with the primary windings 162 and 164.

Figure 6:
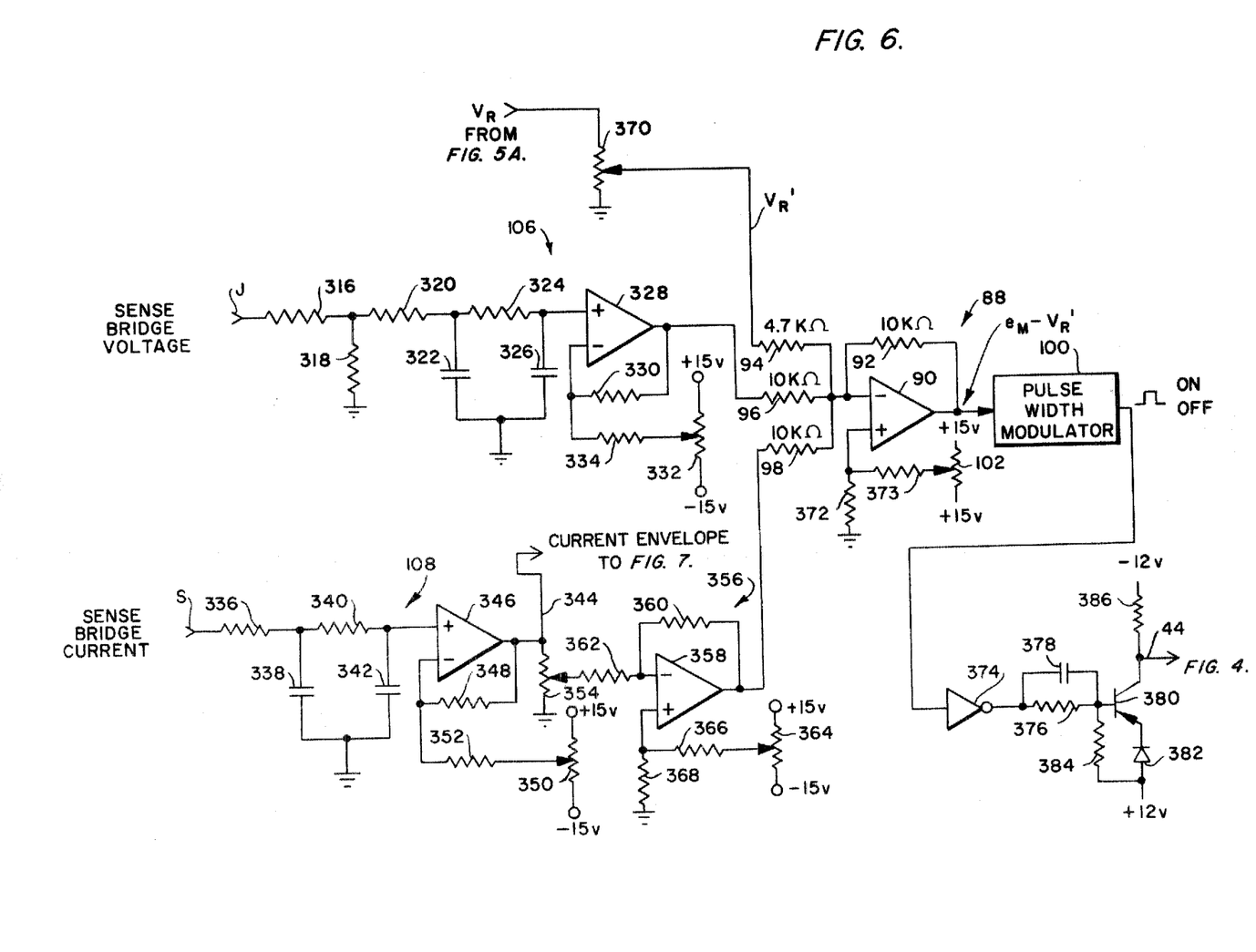
FIG. 6 is a detailed schematic diagram of the second of three channels generally shown in FIG. 3, more particularly comprising negative impedance converter circuitry, as well as a pulse width modulator and output circuitry for driving the circuit block identified as base drive element of FIGS. 2 and 4.

With reference now to FIG. 6, the bridge voltage sensing line J is applied through an input voltage divider comprising resistors 316 and 318 to the low pass filter 106 which, in FIG. 6, may more particularly be seen to comprise an input resistor 320, an input capacitor 322, a series resistor 324, and an output capacitor 326. The voltage envelope output of the low-pass filter 106 is applied to the non-inverting (+) input of a buffer amplifier comprising an operational amplifier 328 including a feedback resistor 330 and an offset adjustment network comprising a potentiometer 332 and a resistor 334 connected to the operational amplifier inverting (−) input.

Similarly, the bridge current sense line S is applied to the low-pass filter 108 which, in FIG. 6, may more particularly be seen to comprise an input resistor 336, an input capacitor 338, a series resistor 340, and an output capacitor 342. The output of the low pass filter 108 supplies a current envelope line 344 through a non-inverting buffer amplifier comprising an operational amplifier 346 having a feedback resistor 348, and an offset adjustment network comprising a potentiometer 350 and a resistor 352 connected to the operational amplifier 346 inverting (−) input.

The current envelope line 344 both supplies the brake control circuitry of FIG. 7, and, through a gain adjustment potentiometer 354, a buffer amplifier 356 having a voltage gain of ten and comprising an operational amplifier 358 with appropriate feedback and input resistors 360 and 362. The operational amplifier 358 has an offset adjustment network comprising a potentiometer 364 and a series resistor 366 connected to the operational amplifier 358 non-inverting (+) input, with a low value resistance 368 connected between the non-inverting (+) input and the circuit reference point.

Another input to the FIG. 6 circuit is the $V_R$ velocity reference line from FIG. 5A, which represents instantaneous desired rotational velocity. The $V_R$ line is supplied to a level setting potentiometer 370 which supplies a scaled $V_R$ line, designated $V_R'$.

As described above with reference to FIG. 3, these three inputs are applied to the summing amplifier 88 comprising the operational amplifier 90 through respective input resistors 96, 98 and 94. Additional element of the summing amplifier 88 not shown in FIG. 3 are resistors 372 and 373 connected to the non-inverting (+) input and the offset adjustment 102.

A previously described, the manner in which the sensed bridge voltage and the sensed bridge current are summed with the $V_R'$ velocity reference implements a negative impedance converter to cancel out the effect of motor internal impedance to provide a summing amplifier output which represents scaled motor voltage minus $V_R'$, as represented by the expression $e_M-V_R$. It will be appreciated that the various adjustment potentiometers of the circuitry are properly adjusted to achieve this result.

The output of the summing amplifier 88 is applid to the input of the pulse width modulator 100 which, for example, operates at 10 kHz to provide the chopper duty cycle signals. The output of the pulse width modulator 100 is applied through an inverter 374 and through an input network comprising a resistor 376 and a speed up capacitor 378 to the base of a PNP switching transistor 380, having its collector connected to the line 44 which drives the transistor $Q_1$ base drive circuitry 40. A biasing diode 382 is connected in series with the transistor 380 emitter, and a biasing resistor 384 is connected between the +12 volt source and the transistor 380 base. A collector resistor 386 is connected to the −12 volt source.

Any suitable pulse width modulator may be employed for the modulator 100. One particular pulse width modulator found to be suitable is a monolithic integrated circuit pulse width modulator manufactured by Silicon General under their Type No. SG2524. It will be appreciated that such pulse width modulators contain an internal sawtooth or triangular wave form generator which sets the basic frequency (e.g., 10 kHz) of the modulator, and further include an internal comparator which compares the instantaneous sawtooth voltage against a reference voltage which is the pulse width modulator control input. As the control input voltage varies, the relative percentage of the time the comparator output is high or low is accordingly controlled. Suitable connections to the pulse width modulator may be found by reference to the data sheets for the Silicon General pulse width modulator integrated circuit.

Referring lastly to FIG. 7, there is shown circuitry for controlling gating of the braking triac $T_5$ (FIGS. 2 and 4) by energizing the pulse transformer primary winding 166.

An input to the brake control circuitry of FIG. 7 is the current envelope line 344 from the output of the buffer amplifier 346 of FIG. 6, which envelope goes to zero as thyristor bridge 46 current goes to zero.

The current envelope line 344 is supplied to the non-inverting (+) input of the comparator 116 comprising an operational amplifier through an input network comprising a pair of series connected resistors 390 and 392, with a pair of oppositely poled silicon switching diodes 394 and 396 connected between the mid point of the resistors 390 and 392 and the circuit reference point for the purpose of preventing saturation of the comparator 116. The zero current reference against which the current envelope on the line 344 is compared is provided by a potentiometer 118 having adjustment range limiting resistors 402 and 404 connected at either end to the plus and minus volt supplies. The movable contact of the potentiometer 118 is connected to the comparator 116 inverting (−) input through a resistor 406. A feedback network for the comparator 116 comprises resistors 408, 410 and 412, and a resistor 414 is connected between the comparator 116 output and the +15 volt supply.

Since the braking triac $T_5$ requires only an initial triggering signal to begin conducting and commutates naturally when motor back emf is zero, it is only necessary to provide a triggering signal. Accordingly, the output of the comparator 388 is applied through an inverter 416 to a low going triggering input of the one millisecond one-shot 122 comprising a monolithic integrated circuit monostable multivibrator having an external resistor 420 and capacitor 422 appropriately connected and sized to provide the required one millisecond time delay. The one-shot 122 output is applied to an input of a NAND gate 424, which in turn supplies the triac $T_5$ gate drive circuit 124 through an inverter 426. The gate drive circuit 124 includes an NPN transistor 428 having a base current limiting resistor 430, with the pulse transformer primary winding 166 connected to the collector and supplied from the +15 volt supply through a resistor 432. A voltage regulating Zener diode 434 and a paralleled filter capacitor 436 regulate the voltage applied to the upper end of the pulse transformer primary winding 166, and a free wheeling diode 438 is connected across the primary winding 166. In order to supply proper pulses for operation of the triac $T_5$ gate triggering transformer, pulses from the 20 kHz spike generator 296 (FIG. 5A) are applied to the NAND gate 424, which pulses are gated during the one millisecond output pulse from the one shot 122. Additionally, to ensure that the brake circuit 58 (FIGS. 2 and 4) is not activated during the spin mode, the external mode control input is applied through an inverter 440 to an input of the NAND gate 424.

In order to enable those skilled in the art to practice the invention without undue experimentation, various suitable components and component values are identified below. It will be appreciated that these are exemplary only, and in no way are intended to limit the scope of the claimed invention.

The various digital logic elements are all conventional CMOS devices, such as those manufactured by Motorola Inc. as part of their MC14000 series. The various operational amplifiers may all be "747" type integrated circuit operational amplifiers, such as National Semiconductor type No. LM747D dual operational amplifiers. For the comparators 116 and 254, a National Semiconductor Type No. LH2311 dual voltage comparator may be employed.

Values of various discrete components are provided in the following tables:

| Resistors | |
|---|---|
| $R_S$ | 0.05 Ohm, 30 watt |
| $R_B$ | 4 Ohm, 12 watt |
| 87, 216, 234, 250 | 5 K Ohm |
| 92 | 10 K Ohm |
| 94 | 417 K Ohm |
| 96, 98, 232, 362 | 10 K Ohm |
| 102, 332, 350, 364 | 50 K Ohm |
| 118 | 500 Ohm |
| 132 | 0.05 Ohm, 100 Watt |
| 134 | 2 K Ohm, 25 watt |
| 140 | 20 Ohm, 30 watt |
| 144 | 10 Ohm, 20 watt |
| 146 | 12 Ohm 2 watt |
| 168 | 39 Ohm |
| 176, 182, 186, 336, 354 | 1 K Ohm |
| 184 | 120 Ohm |
| 188 | 8.2 Ohm |
| 194 | 6.2 Ohm |
| 196, 372 | 100 Ohm |
| 202, 208, 226, 230 | 12 K Ohm |
| 212 | 6.1 K Ohm |
| 214, 248, 256, 406 | 5.1 K Ohm |
| 228 | 18 K Ohm |
| 238 | 6.2 K Ohm |
| 240 | 68 K Ohm |
| 244, 288, 324, 340 | 100 K Ohm |
| 360, 368, 420 | |
| 246 | 180 K Ohm |
| 253 | 110 Ohm |
| 258 | 91 Ohm |
| 260 | 15 K Ohm |
| 262 | 25 K Ohm |
| 264, 268 | 11 K Ohm |
| 266, 408 | 47 K Ohm |
| 270, 412 | 510 Ohm |
| 276, 316, 414 | 7.5 K Ohm |
| 280 | 1.2 K Ohm |
| 302, 386, 430 | 3.3 K Ohm |
| 306 | 160 Ohm, 2 watt |
| 315 | 4.3 K Ohm |
| 318 | 1.87 K Ohm |
| 320 | 9.76 K Ohm |
| 330 348 | 330 Ohm |
| 334, 352 | 1 Meg. Ohm |
| 366, 373 | 200 K Ohm |
| 370 | 2 K Ohm |
| 376 | 33 K Ohm |
| 384 | 9.1 K Ohm |
| 390 | 1.8 K Ohm |
| 392, 410 | 11 K Ohm |
| 402, 404 | 13 K Ohm |
| 432 | 200 Ohm, 2 watt |

| Capacitors | |
|---|---|
| 36 | 1100 mfd, 250 volt |
| 138 | 0.1 mfd, 350 volt |

| -continued | |
|---|---|
| 142 | 0.047 mfd |
| 148, 322, 422 | 0.01 mfd |
| 150 | 8 mfd, 450 volt |
| 178, 338 | 0.1 mfd |
| 180 | 4.7 mfd |
| 192 | 2.2 mfd |
| 210, 236, 242 | 100 pf |
| 282 | 680 pf |
| 290 | 1 mfd |
| 326, 342 | 0.001 mfd |
| 436 | 200 mfd, 15 volt |
| Inductor Devices | |
| 62 | 1 mHy |
| Pulse transformers | Pulse Engineers Type No. 2231 |
| Semiconductor Devices | |
| $SCR_1$–$SCR_4$ | General Electric Type No. C23402 |
| $T_5$ | General Electric Type No. SC26002 |
| $Q_1$ | Motorola Type No. MJ10015 |
| 300, 428 | 2N222 |
| 172 | Motorola Type No. MJE220 |
| 174 | Motorola Type No. MJE224 |

It will therefore be appreciated that the present invention provides a power control circuit particularly suited for a DC motor washing machine drive, and which advantageously employs the characteristics of a single high speed switching transistor for chopper operation, and five relatively small and inexpensive thyristors for speed control and braking functions to provide an entirely satisfactory drive for a direct drive washing machine.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A power control circuit for a DC washing machine drive motor having a pair of DC input terminals, said circuit responsive both to relatively lower frequency motor direction control input signals and to relatively higher frequency chopper duty cycle speed control input signals, and comprising:
    a pair of DC supply conductors for connection to a power source;
    a chopped DC supply conductor;
    a high frequency switching transistor connected in series between one of said DC supply conductors and said chopped DC supply conductor;
    a four-leg polarity-reversing thyristor bridge having an opposite pair of input nodes respectively connected to said chopped DC supply conductor and to the other of said DC supply conductors, and having an opposite pair of output nodes connected to respective motor input terminals, such that motor polarity is controlled by activating either one or the other pair of diagonally opposite thyristors; and
    circuitry for applying the relatively higher frequency chopper duty cycle speed control input signals to activate said high frequency switching transistor and for applying the relatively lower frequency motor direction control input signals to alternately activate said thyristors in diagonally opposite pairs.

2. A power control circuit according to claim 1, which further comprises:
    a braking circuit comprising a braking thyristor and a dissipative circuit element connected in series across the motor input terminals; and
    circuitry for sensing current through the motor and for filtering out relatively higher frequency chopping components to develop a current envelope corresponding to the relatively lower frequency motor direction control signals, and for triggering said braking thyristor when the current envelope is zero due to motor induced back emf at least equalling applied emf.

3. A power control circuit according to claim 2, wherein said dissipative circuit element is a resistor.

4. A power control circuit according to claim 1, wherein said bridge thyristors are silicon controlled rectifiers.

5. A power control circuit according to claim 2, wherein said braking thyristor is a triac.

6. A power control circuit according to claim 5, wherein said bridge thyristors are silicon controlled rectifiers.

7. A power control circuit according to claim 1, wherein said pair of DC supply conductors carry substantially unfiltered rectified AC power.

8. A control system for a DC washing machine drive motor having a pair of DC input terminals, said system comprising:
    a pair of DC supply conductors for connection to a power source;
    a chopped DC supply conductor;
    a high frequency switching transistor connected in series between one of said DC supply conductors and said chopped DC supply conductor;
    a four-leg polarity-reversing thyristor bridge having an opposite pair of input nodes respectively connected to said chopped DC supply conductor and to the other of said DC supply conductors, and having an opposite pair of output nodes connected to respective motor input terminals, such that motor polarity is controlled by activating either one or the other pair of diagonally opposite thyristors;
    a source of relatively lower frequency control signals representing desired motor rotational velocity and direction for agitation cycles;
    circuitry responsive to the relatively lower frequency control signals for applying relatively higher frequency chopper duty cycle controlled switching signals to activate said switching transistor in accordance with the signals representing desired motor rotational velocity; and
    circuitry responsive to the relatively lower frequency control signals for alternately activating said thyristors in diagonally opposite pairs in accordance with the signals representing desired motor rotational direction.

9. A control system according to claim 8, wherein said source of relatively lower frequency control signals comprises:
    a motor agitation velocity profile generator outputting a signal oscillating about a reference level at relatively low frequency, the instantaneous magnitude of said oscillating signal with respect to said reference level representing desired motor rotational velocity and direction for agitation cycles;

means for sensing the crossing of said oscillating signal through the reference level to generate a signal to change rotational direction; and means for sensing the absolute value of said oscillating signal with respect to said reference level to indicate desired motor rotational velocity.

10. A control system according to claim 8, wherein said circuitry for applying chopper duty cycle controlled switching signals to said switching transistor comprises a feedback servomechanism including:

means for generating a signal representative of actual motor velocity;

a summing amplifier responsive to the signal representing desired motor rotational velocity and to the signal representative of actual motor velocity to generate a difference signal; and a duty cycle controller responsive to the difference signal to provide transistor switching signals.

11. A control system according to claim 10, wherein said duty cycle controller comprises a pulse width modulator.

12. A control system according to claim 10, wherein said means for generating a signal representative of actual motor velocity comprises a negative impedance converter circuit responsive both to voltage across the motor and to current through the motor to derive a signal representative of motor emf.

13. A control system according to claim 8, which further comprises:

a bracking circuit comprising a braking thyristor and a dissipative circuit element connected in series across the motor input terminals; and circuitry for sensing current through the motor and for filtering out relatively higher frequency chopping components to develop a current envelope corresponding to the relatively lower frequency motor direction control signals, and for triggering said braking thyristor when the current envelope is zero due to motor induced back emf at least equalling applied emf.

14. A power control circuit according to claim 13, wherein said dissipative circuit element is a resistor.

15. A power control circuit according to claim 8, wherein said bridge thyristors are silicon controlled rectifiers.

16. A power control circuit according to claim 13, wherein said braking thyristor is a triac.

17. A power control circuit according to claim 16, wherein said bridge thyristors are silicon controlled rectifiers.

18. A power control circuit according to claim 8, wherein said pair of DC supply conductors carry substantially unfiltered rectified AC power.

* * * * *